US011447135B2

(12) United States Patent
Takamatsu et al.

(10) Patent No.: US 11,447,135 B2
(45) Date of Patent: Sep. 20, 2022

(54) DRIVE ASSISTING METHOD AND VEHICLE CONTROL DEVICE

(71) Applicant: Nissan Motor Co., Ltd., Yokohama (JP)

(72) Inventors: Yoshiro Takamatsu, Kanagawa (JP); Yohei Mishina, Kanagawa (JP); Takato Kurokawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 42 days.

(21) Appl. No.: 17/253,492

(22) PCT Filed: Jun. 29, 2018

(86) PCT No.: PCT/IB2018/000874
§ 371 (c)(1),
(2) Date: Dec. 17, 2020

(87) PCT Pub. No.: WO2020/002962
PCT Pub. Date: Jan. 2, 2020

(65) Prior Publication Data
US 2021/0253107 A1 Aug. 19, 2021

(51) Int. Cl.
*B60W 30/18* (2012.01)
*B60W 40/06* (2012.01)
*G06V 20/56* (2022.01)

(52) U.S. Cl.
CPC ...... *B60W 30/18163* (2013.01); *B60W 40/06* (2013.01); *G06V 20/588* (2022.01); *B60W 2552/10* (2020.02); *B60W 2554/4041* (2020.02)

(58) Field of Classification Search
CPC .......... B60W 30/18163; B60W 40/06; B60W 30/14; B60W 2552/10; B60W 2554/4041; G06V 20/588; G08G 1/167; G08G 1/09; G08G 1/16; B60R 21/00; G01C 21/00; G05D 1/0061; G05D 1/0088; G05D 1/021;
(Continued)

(56) References Cited

U.S. PATENT DOCUMENTS 10,114,371 B2 * 10/2018 Asakura ............ B62D 15/0255
10,293,819 B1 * 5/2019 El-Khatib .......... B60W 60/001
10,435,031 B2 * 10/2019 Shibata ............ G08G 1/096716
(Continued)

FOREIGN PATENT DOCUMENTS

CN 111391844 A * 7/2020 .......... B60W 30/095
CN 112758092 A * 5/2021
(Continued)

*Primary Examiner* — Angelina Shudy
(74) *Attorney, Agent, or Firm* — Young Basile Hanlon & MacFarlane, P.C.

(57) ABSTRACT

A travel assistance method for a vehicle, executed by the processor, comprising: detecting a road structure including a merging point where a merging lane and a merged lane merge, detecting a state of another vehicle traveling toward a merging point, setting, based on the road structure, a merging position relative to a traveling vehicle (other vehicle) traveling in the merged lane and a determination criterion for determining whether or not merging is possible at the merging position, and determining whether or not merging is possible based on the state of the subject vehicle, the state of the other vehicle and the determination criterion.

6 Claims, 8 Drawing Sheets

(58) Field of Classification Search
CPC ... G05D 1/0214; G05D 1/0221; G05D 1/0223
See application file for complete search history.

(56) References Cited

U.S. PATENT DOCUMENTS

| | | | | |
|---|---|---|---|---|
| 10,632,997 | B2* | 4/2020 | Inou | B60W 30/18163 |
| 11,161,512 | B2* | 11/2021 | Takeda | G06V 20/588 |
| 11,225,257 | B2* | 1/2022 | Okuyama | G01C 21/26 |
| 11,295,609 | B1* | 4/2022 | Tanaka | G08G 1/167 |
| 11,370,442 | B2* | 6/2022 | Sakayori | B60W 30/18163 |
| 2005/0015203 | A1 | 1/2005 | Nishira | |
| 2015/0025784 | A1* | 1/2015 | Kastner | B60W 30/0956 |
| | | | | 701/119 |
| 2015/0100216 | A1* | 4/2015 | Rayes | G01S 13/867 |
| | | | | 701/96 |
| 2015/0153735 | A1* | 6/2015 | Clarke | B62D 15/025 |
| | | | | 701/301 |
| 2017/0248959 | A1* | 8/2017 | Matsubara | B60W 10/20 |
| 2017/0297622 | A1* | 10/2017 | Niemz | B62D 15/029 |
| 2017/0369055 | A1* | 12/2017 | Saigusa | G08G 1/0141 |
| 2018/0047292 | A1* | 2/2018 | Hashimoto | B60W 30/00 |
| 2018/0074497 | A1* | 3/2018 | Tsuji | G06V 20/59 |
| 2018/0326996 | A1* | 11/2018 | Fujisawa | B60W 50/16 |
| 2019/0095724 | A1* | 3/2019 | Ueda | G06T 7/73 |
| 2019/0114915 | A1* | 4/2019 | Patel | G05D 1/0214 |
| 2019/0143972 | A1* | 5/2019 | Ishioka | G06V 20/588 |
| | | | | 701/70 |
| 2019/0266489 | A1* | 8/2019 | Hu | G06N 3/08 |
| 2019/0271985 | A1* | 9/2019 | Mimura | B60W 60/0011 |
| 2019/0294179 | A1* | 9/2019 | Stein | G05D 1/0088 |
| 2019/0329778 | A1* | 10/2019 | D'sa | B62D 15/025 |
| 2019/0329779 | A1* | 10/2019 | D'sa | G06N 20/20 |
| 2019/0382009 | A1* | 12/2019 | Iwasa | G08G 1/0969 |
| 2020/0086764 | A1* | 3/2020 | Mimura | B60W 30/18 |
| 2020/0166362 | A1* | 5/2020 | Ichinokawa | G01C 21/3605 |
| 2020/0180638 | A1* | 6/2020 | Kanoh | B60W 30/095 |
| 2020/0231158 | A1* | 7/2020 | Okuyama | B60W 50/082 |
| 2020/0231178 | A1* | 7/2020 | Murayama | B60W 60/0016 |
| 2021/0039649 | A1* | 2/2021 | Yu | G06V 20/58 |
| 2021/0070291 | A1* | 3/2021 | Yu | B60W 30/162 |
| 2021/0129840 | A1* | 5/2021 | Zhang | B60W 10/18 |
| 2021/0256851 | A1* | 8/2021 | Uenoyama | G08G 1/162 |
| 2021/0291835 | A1* | 9/2021 | Jalali | G08G 1/075 |
| 2021/0300369 | A1* | 9/2021 | Yu | G06V 20/58 |
| 2021/0300373 | A1* | 9/2021 | Yoda | B60W 30/0956 |
| 2022/0089163 | A1* | 3/2022 | Qiao | B60W 40/04 |
| 2022/0163341 | A1* | 5/2022 | Maru | G01C 21/3658 |

FOREIGN PATENT DOCUMENTS

| | | | | |
|---|---|---|---|---|
| JP | H1139599 | A | * 2/1999 | |
| JP | 2969176 | B1 | * 11/1999 | |
| JP | 2006176069 | A | * 7/2006 | |
| JP | 2007-304992 | A | 11/2007 | |
| JP | 2011-028630 | A | 2/2011 | |
| JP | 2016-017758 | A | 2/2016 | |
| JP | 2016-017914 | A | 2/2016 | |
| JP | 2016-018495 | A | 2/2016 | |
| JP | 2017-207812 | A | 11/2017 | |
| JP | 2018-076004 | A | 5/2018 | |
| JP | 2018076004 | A | * 5/2018 | |
| JP | 2022014810 | A | * 1/2022 | ............ B60W 30/09 |
| WO | WO-2015064041 | A1 | * 5/2015 | ............ B60K 35/00 |
| WO | WO-2019069868 | A1 | * 4/2019 | |

* cited by examiner

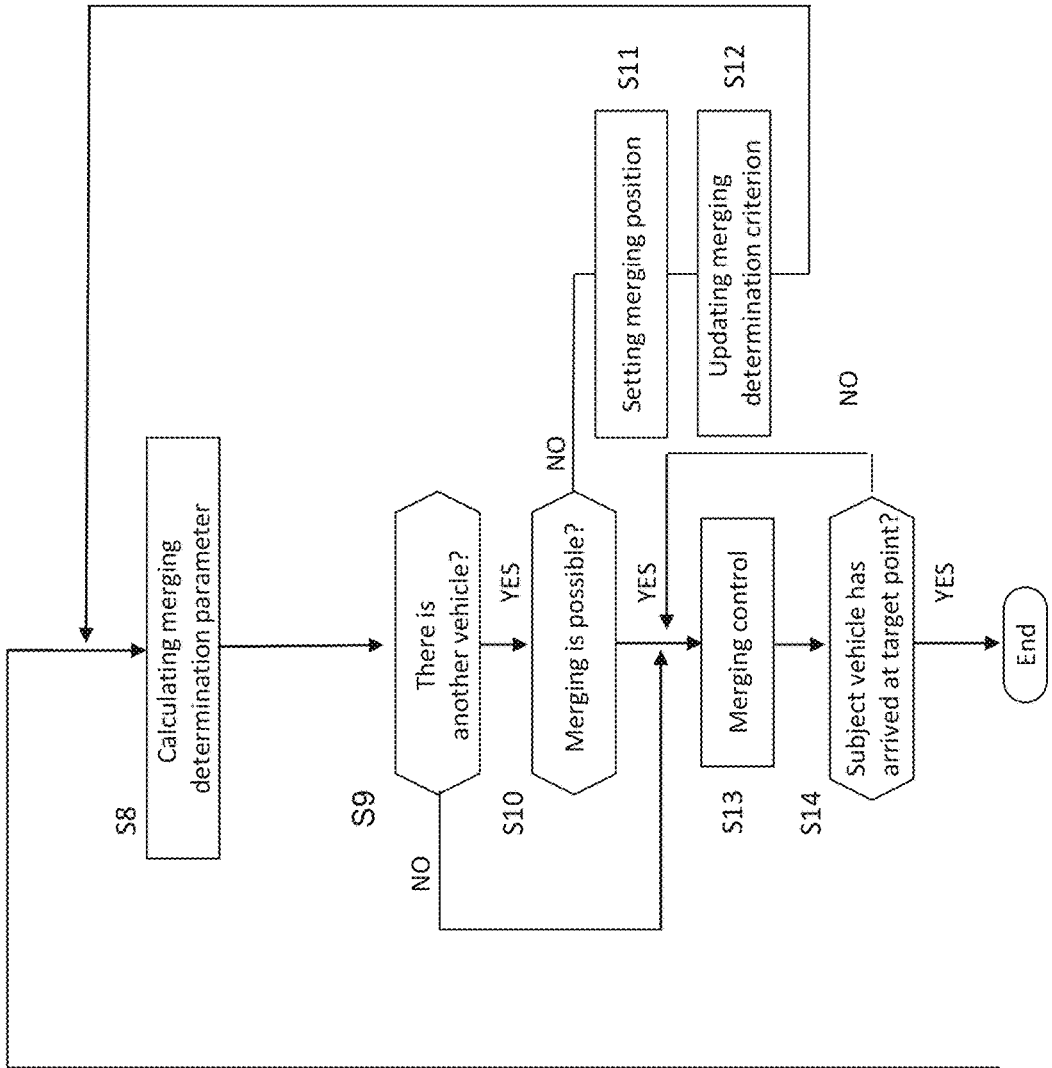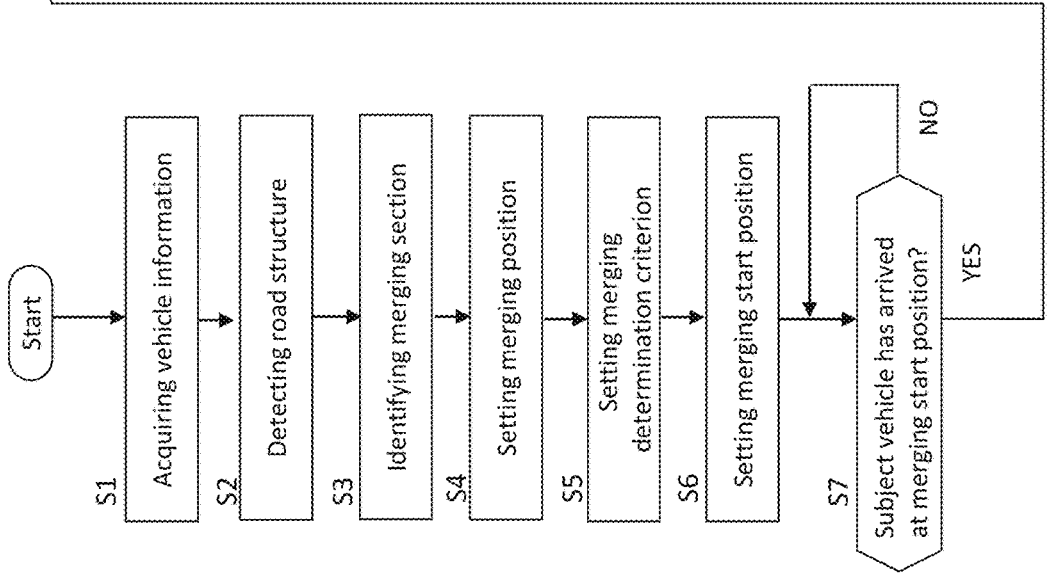

DRIVE ASSISTING METHOD AND VEHICLE CONTROL DEVICE

TECHNICAL FIELD

The present invention relates to a vehicle control method and a vehicle control device.

BACKGROUND

Traditionally, a driving support device which performs lane merging support for a subject vehicle is known. The driving support device includes: a driving support unit that calculates a target traveling speed of a target vehicle as a control target when the target vehicle is traveling on a merging road; a communication unit that communicates with the vehicle traveling on the merged road; a range acquisition unit that acquires a detection range for detecting a vehicle that may reach the merging point simultaneously with the target vehicle among the vehicles traveling on the merged road; and a vehicle setting unit that sets at least one of the communicable vehicles as a merged vehicle to which the target vehicle should join in front of the vehicle when a vehicle that can communicate with the communication unit is present in the detection range acquired by the range acquisition unit. See JP2017-207812A.

SUMMARY

However, in the above prior art, although the driving support on the assumption of merging the target vehicle in front of the merged vehicle, in practice, the merging position and merging determination criteria of the vehicle is affected by the road structure. Therefore, there is a problem that the above-mentioned conventional driving support device cannot execute appropriate merging control.

A problem to be solved by the present invention is to provide a travel assistance method or a travel assistance device that can execute appropriate merging assistance control.

The present invention solves the above problem through detecting a merging point into which a merging lane and a merged lane merge, the merging lane being a lane in which a subject vehicle is traveling, and the merged lane being adjacent to the merging lane, and in a case in which another vehicle traveling in the merged lane toward the merging point is detected, setting, behind the other vehicle, a merging position of the subject vehicle at the merging point so as to execute a merging control when a length of the merging lane is shorter than a predetermined length.

The present invention is characterized by detecting a merging point into which a merging lane and a merged lane merge, the merging lane being a lane in which a subject vehicle is traveling, and the merged lane being adjacent to the merging lane, and in a case in which another vehicle traveling in the merged lane toward the merging point is detected, setting, behind the other vehicle, a merging position of the subject vehicle at the merging point so as to execute a merging control when a terminal distance from a position of the subject vehicle to an end of the merging lane is shorter than a threshold.

The present invention is characterized by detecting a merging point into which a merging lane and a merged lane merge, the merging lane being a lane in which a subject vehicle is traveling, and the merged lane being adjacent to the merging lane, and in a case in which another vehicle traveling in the merged lane toward the merging point is detected, setting, behind the other vehicle, a merging position of the subject vehicle at the merging point so as to execute a merging control when the number of lanes included in the merged lane is less than a threshold.

The present invention is characterized by detecting a merging point into which a merging lane and a merged lane merge, the merging lane being a lane in which a subject vehicle is traveling, and the merged lane being adjacent to the merging lane, and in a case in which another vehicle traveling in the merged lane toward the merging point is detected, setting a determination criterion for determining whether or not merging is possible so that the higher curvature of the merging lane is, the more likely it is to be determined that merging is possible near an end of the merging lane so as to execute a merging control.

The present invention is characterized by detecting a merging point into which a merging lane and a merged lane merge, the merging lane being a lane in which a subject vehicle is traveling, and the merged lane being adjacent to the merging lane, and in a case in which another vehicle traveling in the merged lane toward the merging point is detected, setting, near an end of the merging lane, a merging position of the subject vehicle at the merging point so as to execute a merging control when a height of a feature existing at a boundary portion between the merging lane and the merged lane is higher than a predetermined height threshold.

According to the present invention, appropriate merge control can be performed.

BRIEF DESCRIPTION OF THE DRAWINGS

FIG. 2 is a flowchart showing a control flow of the control device;

DETAILED DESCRIPTION

Hereinafter, a travel assistance device and method for a vehicle according to one or more embodiments of the present invention will be described with reference to the drawings. In the present embodiment, the present invention will be described by exemplifying a travel assistance device equipped in a vehicle.

First Embodiment

Figure 1:
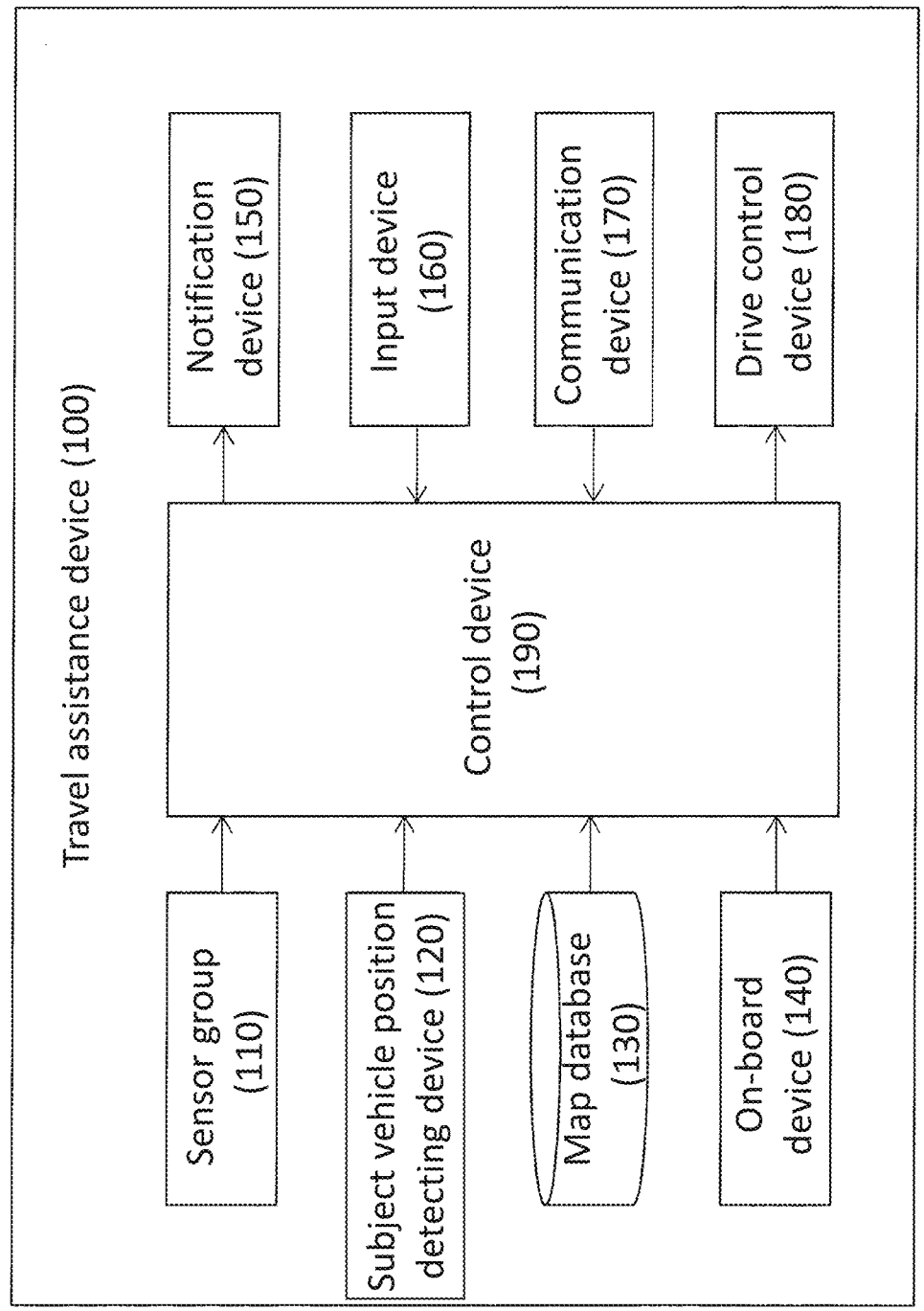
FIG. 1 is a configuration diagram showing a configuration of a travel assistance device according to one or more embodiments of the present invention.

FIG. 1 is a diagram showing a configuration of a travel assistance device 100 according to one or more embodiments of the present invention. As shown in FIG. 1, the travel assistance device 100 according to one or more embodiments of the present invention includes a sensor group 110, a subject vehicle position detecting device 120, a map database 130, an on-board device 140, a notification device 150, an input device 160, a communication device 170, a drive control device 180, and a control device (controller) 190. These devices are connected by a CAN (Controller Area Network) and other on-board LANs to exchange information with each other.

The sensor group 110 has an external sensor for detecting the state (external state) around the subject vehicle, and a sensor for detecting the state of the subject vehicle. For example, sensor group 110 include a front camera for capturing the front of the subject vehicle, a rear camera for capturing the rear of the subject vehicle, a front radar for detecting an obstacle in front of the subject vehicle, a rear radar for detecting an obstacle in the rear of the subject vehicle, a side radar for detecting an obstacle in the side of the subject vehicle, a vehicle speed sensor for detecting the vehicle speed of the subject vehicle, and an in-vehicle camera for capturing a driver. As the sensor group 110, it may be a configuration using one of the plurality of sensors described above, and it may be a configuration using a combination of two or more types of sensors. The detection result of the sensor 110 is output to the control device 190. As a result, the control device 190 acquires external information and information of the subject vehicle.

The subject vehicle position detecting device 120 is composed of a GPS unit, a gyro sensor, and a vehicle speed sensor, and the like. The subject vehicle position detecting device 120 detects radio waves transmitted from a plurality of satellite communications by the GPS unit, and periodically acquires position information of an object vehicle (subject vehicle). Then, the subject vehicle position detecting device 120 detects the current position of the object vehicle based on the position information of the object vehicle obtained, angle change information obtained from the gyro sensor, and the vehicle speed acquired from the vehicle speed sensor. In addition or alternatively, the subject vehicle position detecting device 120 can detect the position of the subject vehicle using a well-known map matching technique. The position information of the object vehicle detected by the subject vehicle position detecting device 120 is output to the control device 190.

The map database 130 stores map information including location information of various facilities and specific locations. In the map information, the information of the road shape in each map coordinate, such as attributes of a curve, hill, intersection, interchange, narrow route, straight line, road shoulder structure, branch point, tollbooth, reduction position of the number of lanes, and a service area (SA)/parking area (PA) are recorded in correspondence with the map coordinate (location information). The merging point is the place where the merging lane and the merged lane adjacent to the merging lane merge. For example, in a highway, the main line corresponds to a merged lane. The map information includes information on the road structure including the merging point, including information on the length of the merging lane, the curvature of the merging lane, the curvature of the merged lane, and the number of lanes of the merged lane. The map information contains the information of the features located at the boundary part between the merging lane and the merged lane. The features are, for example, the boundary wall, the separation zone, the silencing wall, etc. between the merging lane and the merged lane. The feature information includes information on the position, height, length, and the like of the feature. The map information stored in the map database 130 may be high-definition map information suitable for automatic operation. The high-definition map information is acquired by communication with the outside. The high-definition map information may be generated based on information acquired in real time using the sensor group 110. The map information stored in the map database is accessible by the control device 190.

On-board device 140 is various devices equipped in a vehicle, and operates by being controlled by a driver. Such on-board devices include steering, accelerator pedals, brake pedals, navigation devices, audio devices, air conditioners, hands-free switches, power windows, wipers, lights, direction indicators, horns, and the like. When the on-board device 140 is operated by the driver, information is output to the control device 190.

Notification device 150 may be, for example, a display provided by a navigation device, a display installed in a room mirror, a display installed in a meter section, a head-up display projected on a windshield, or a speaker provided by an audio device.

The input device 160 is, for example, a dial switch to which a driver can input manually, a touch panel installed on a display screen, or a microphone to which a driver can input by voice. In one or more embodiment of the present invention, the driver can set on/off of the automatic operation control by operating the input device 160. In the automatic operation control of the vehicle according to one or more embodiment of the present invention, when there is a preceding vehicle in front of the subject vehicle, the distance between the subject vehicle and the preceding vehicle is maintained at a vehicle distance set by the driver, and the vehicle distance control for controlling the subject vehicle to travel so that the subject vehicle follows the preceding vehicle (preceding vehicle following control) is performed. When there is no preceding vehicle in front of the subject vehicle, the speed control for controlling the subject vehicle to travel at a vehicle speed set by the driver is performed. In one or more embodiment of the present invention, the driver can operate the input device 160 thereby to set a set vehicle speed (e.g. a specific speed value) of the subject vehicle in the speed control and a set inter-vehicle distance (e.g. any of three stages of a short distance, a medium distance, and a long distance) in the inter-vehicle distance control. Automatic operation control includes merging control (lane change control).

The communication device 170 communicates with the communication device outside the vehicle. The communication device 170 acquires traffic congestion information and the like. For example, the communication device 170 can acquire various types of information from an external device by performing inter-vehicle communication with another vehicle, performing road—vehicle communication with a device installed on a road shoulder, or performing wireless communication with an information server installed outside the vehicle. The information acquired by the communication device is output to the control device 190.

The drive control device 180 controls the travel of the subject vehicle. The drive control device 180 includes a brake control mechanism, an accelerator control mechanism, an engine control mechanism, and an HMI (human interface) device and the like. The drive control device 180 executes the automatic operation of the subject vehicle by controlling the operation of the drive mechanism (including the operation of the internal combustion engine in the case of an engine vehicle, the electric motor operation in the case of an electric vehicle system, and the torque distribution between the internal combustion engine and the electric motor in the case of a hybrid vehicle), the brake operation, and the operation of the steering actuator, etc., according to the travel scene of the subject vehicle. Incidentally, the drive control device 180 controls the travel of the subject vehicle by a command of the control device 190 described later. Other well-known methods may also be used as a travel control method by the drive control device 180.

Control device 190 includes a processor, and consists of a ROM (Read Only Memory) storing programs for controlling the travel of the subject vehicle, a CPU (Central Processing Unit) executing programs stored in the ROM, and a RAM (Random Access Memory) serving as an accessible storage device. As operation circuits, MPUs (Micro Processing Unit), DSPs (Digital Signal Processor), ASIC (Application Specific Integrated Circuit, and FPGA (Field Programmable Gate Array) can be used instead of or together with CPUs (Central Processing Unit).

The control device 190 executes a program stored in the ROM by the CPU and thereby implements an information acquisition function for acquiring vehicle information related to the travel of the subject vehicle and external information of the subject vehicle, a travel scene determination function for determining the travel scene of the subject vehicle, and a travel control function for controlling the travel of the subject vehicle. Each function of the control device 190 will be described below.

The control device 190 acquires vehicle information about the travel of the subject vehicle by the information acquisition function. Travel information includes vehicle speed information of the subject vehicle detected by a vehicle speed sensor, image information of a driver's face captured by an in-vehicle camera, and the like. Further, the control device 190 acquires, as the travel information, the information of the current position of the subject vehicle from the subject vehicle position detecting device 120. In addition, the control device 190 acquires, from the map database 130, position information of a merging point, a branch point, a toll gate, a reduction position of the number of lanes, a service area (SA)/parking area (PA), and the like, and information on the road structure.

For example, the control device 190 acquires, by the information acquisition function, image information of the outside of the vehicle captured by the front camera and the rear camera, and external information about the area around the subject vehicle from the detection result by the front radar, the rear radar, and the side radar. The drive control device 180 uses the sensor group 110 to acquire vehicle information of the other vehicle traveling around the subject vehicle. The vehicle information of the other vehicle includes at least the position information of the other vehicle.

The control device 190, by the travel scene determination function, refers to a table stored in the ROM of the control device 190, and determines the travel scene in which the subject vehicle is traveling. The travel scene is a merging scene in which a vehicle merges from a merging lane into a merged lane, a travel scene in which a vehicle travels on a main line connected to a merged lane, etc. The travel scene is stored in a database as a table. The control device 190 identifies the road state around the current position by referring to the map information, and determines whether or not the identified road state corresponds to the travel scene included in the table. Then, the control device 190 determines that the current travel scene is a scene suitable for vehicle merging control when the specified road state corresponds to, for example, a merging scene.

The control device 190 controls the travel of the subject vehicle by the travel control function. For example, the travel control function, based on the detection result of the sensor group 110, detects the lane marks of the lane in which the subject vehicle travels (hereinafter, also referred to as a lane for the subject vehicle.) and performs lane keeping control for controlling the travel position in the width direction of the subject vehicle so that the subject vehicle travels in the lane for the subject vehicle. In this case, the control device 190 may make the drive control device 180 control the operation of the steering actuator and the like so that the subject vehicle travels at an appropriate travel position. Further, the control device 190 may perform follow travel control to automatically follow the preceding vehicle with a certain distance between the subject vehicle and the preceding vehicle. In this case, the travel control function makes the drive control device 180 to control the operation of the driving mechanism, such as an engine or brake, so that the subject vehicle and the preceding vehicle travel at a certain inter-vehicle distance.

Further, when the control device 190 controls the drive control device 180 to keep the travel of the subject vehicle in a lane (hereinafter, also referred to as a lane for the subject vehicle.) in which the subject vehicle travels (hereinafter, also referred to as lane keeping control), the control device 190 detects the lane mark of the lane for the subject vehicle, based on the detection result of the sensor group 110, and controls the travel position in the width direction of the subject vehicle by controlling the operation of the steering actuator and the like. Further, when the drive control device 180 controls the travel of the subject vehicle from the merging lane in which the subject vehicle travels to adjacent lane adjacent to the merging lane (corresponding to the merged lane), the drive control device 180 controls the operation of the drive mechanism, brake operation, and the operation of the steering actuator, etc., to control the vehicle speed of the subject vehicle and the steering angle of the subject vehicle, based on the detection result of the sensor 110. Thus, the travel control of the subject vehicle when the subject vehicle merges from the merging lane to the adjacent lane (hereinafter, also referred to as the vehicle merging control) is performed. In the vehicle merging control, the control device 190 uses sensors or the like to detect a predetermined merging possible area on the main line, including a target point for automatic operation, and controls the vehicle speed of the subject vehicle and the steering angle of the subject vehicle so that the subject vehicle travels toward the target point. Automatic driving control by the travel control function is executed according to traffic laws and regulations in each country. Details of the control method by the vehicle merging control function will be described later.

Figure 3:
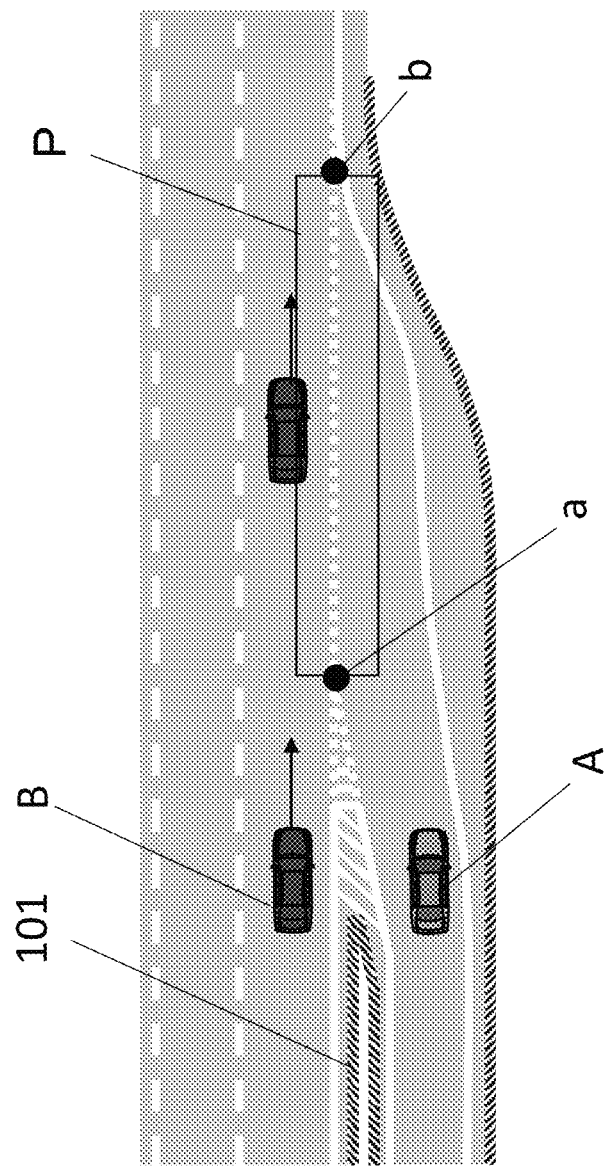
FIG. 3 is a diagram for explaining a control when a subject vehicle merges from a merging lane into an adjacent lane.
Figure 4:
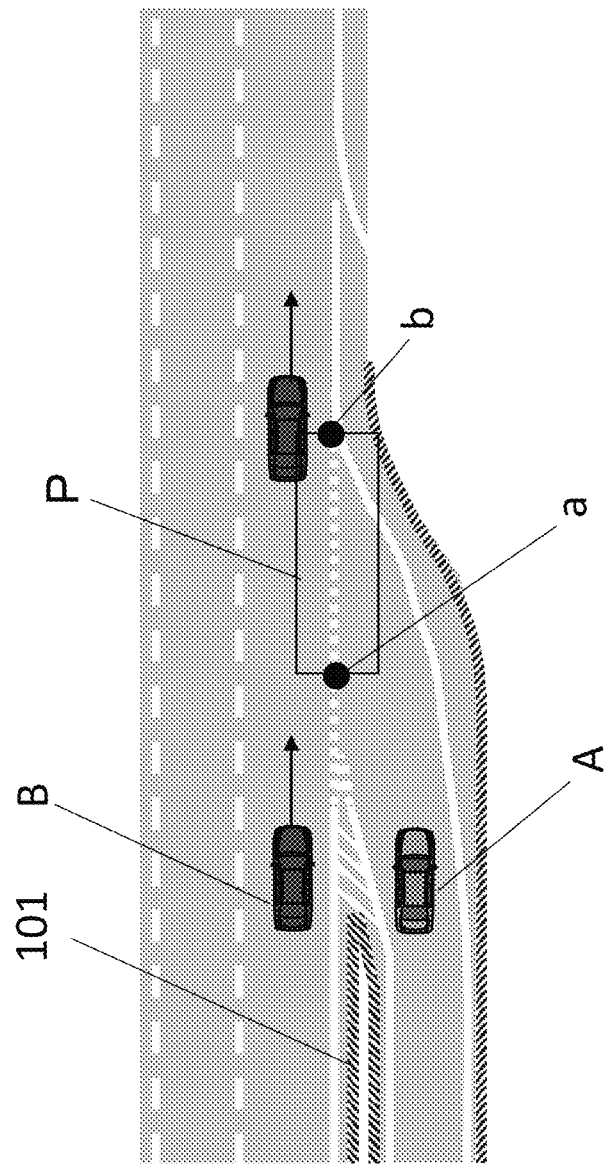
FIG. 4 is a diagram for explaining a control when a subject vehicle merges from a merging lane into an adjacent lane.

Next, with reference to FIGS. 2, 3, and 4, the travel control process at the time of merging according to one or more embodiment of the present invention will be described. FIG. 2 is a flowchart showing a control flow of the control device 190. FIGS. 3 and 4 are diagrams for explaining a control when a subject vehicle merges from a merging lane to an adjacent lane. FIGS. 3 and 4 are diagrams for explaining a road structure including a merging point. FIG. 3 shows the road structure when the merging lane is long, and FIG. 4 shows the road structure when the merging lane is short. The travel control process described below is executed by the control device 190. Further, the travel control process described below starts when the ignition switch or the power switch is turned on, and is repeatedly executed at a predetermined cycle (for example, every 10 milliseconds) until the ignition switch or the power switch is turned off.

The following description is based on an exemplary scene in which the automatic operation control is input (turned on) by the driver. The driver turns on the automatic operation control via the input device 160. While the subject vehicle maintains the lane on the travel path, in the automatic follow control to follow the preceding vehicle, or, in the absence of a preceding vehicle, the control to travel at a predetermined vehicle speed is performed. The travel path is a path to a destination, and is calculated by, for example, a navigation system.

In step S1, the control device 190 acquires the vehicle information of the subject vehicle from the subject vehicle position detecting device 120 and the on-board device 140. Further, the control device 190 acquires the vehicle information of the other vehicle using the sensor group 110 or the like. The vehicle information includes information indicative of the current state of the vehicle, such as the vehicle speed of the subject vehicle and/or other vehicle, and information of the current position of the subject vehicle and/or other vehicle, and the like.

In step S2, the control device 190 acquires map information from the map database 130, and detects a road structure around the subject vehicle position. In step S3, the control device 190 identifies the merging section based on the road structure. The merging section is the section where the merging lane and the merged lane are connected. Incidentally, if the subject vehicle is not traveling near the merging section (e.g., when traveling on a straight road where the merging lane is not connected), the control device 190 ends the control flow shown in FIG. 2.

In step S4, the control device 190, based on the road structure, identifies the merging possible area, and sets the merging position in the merging possible area. The merging possible area and the merging position will be described with reference to FIGS. 3 and 4. Incidentally, in FIGS. 3 and 4, the vehicle A represents the subject vehicle, and the vehicle B represents another vehicle. Merging possible area P represents the area where the vehicle can move from the merging lane to the merged lane in automatic driving control, and is set to the same or narrower range than the permitted area where lane change is permitted by traffic regulations. The merging possible area P is set on the travel lane and is the range from the position of the other vehicle on the travel lane to the merging position. The merging position is a position set on the merged lane, and is a target position when the lane change is performed. As shown in FIGS. 3 and 4, a wall 101, such as a noise barrier, is installed at the boundary portion between the merging lane and the merged lane to separate between the merging lane and the merged lane. Then, in the traveling direction of the vehicle, travel prohibition band drawn by zebra pattern is provided at the end of the wall 101. Incidentally, the end b of the merging lane represents the dead point. When the vehicle changes the lane from the merging lane to the merged lane, it is necessary to perform the lane change before reaching the end b.

The length in the traveling direction of the vehicle in the merging possible area corresponds to a length of the merging lane. Note that the length of the merging lane does not necessarily correspond to the length of the merging possible area. For example, if a wall is set at the left boundary of the merging lane, the merging lane will be longer than the length of the merging possible area. That is, a length from the point where the subject vehicle is supposed to start accelerating in preparation for merging to the end of the merging lane may be the length of the merging lane.

When the length of the merging lane is long as shown in FIG. 3, the subject vehicle can perform sufficiently acceleration. Therefore, the difference between the vehicle speed of the subject vehicle at the time of merging control start and the vehicle speed of the vehicle traveling in the merged lane is small. In such a case, the merging position is set in front of the traveling vehicle traveling in the merged lane since the subject vehicle performs lane change leaving in front of the other vehicle when the subject vehicle performs lane change from the merging lane to the merged lane.

On the other hand, when the length of the merging lane is short as shown in FIG. 4, the subject vehicle cannot perform sufficiently accelerated. Therefore, the difference between the vehicle speed of the subject vehicle at the time of merging control start and the vehicle speed of the vehicle traveling in the merged lane is large. In such a case, the merging position is set behind the traveling vehicle traveling in the merged lane since the subject vehicle performs lane change behind the other vehicle when the subject vehicle performs lane change from the merging lane to the merged lane.

In other words, the merging position relative to the other vehicle is affected by the road structure including the merging point. A determination threshold for determining whether the merging position is in front of the other vehicle or behind the other vehicle is set in the control device 190 in advance. The control device 190 compares the length of the merging lane included in the road structure with the determination threshold. If the length of the merging lane is equal to or greater than the determination threshold, the control device 190 sets the merging position in front of the other vehicle. On the other hand, if the length of the merging lane is less than the determination threshold, the control device 190 sets the merging position behind the other vehicle.

In the examples of FIGS. 3 and 4, the subject vehicle A and the other vehicle B traveling next to the subject vehicle travel at the same vehicle speed to each other, and the relative position of the traveling direction of the vehicle is the same. In such a case, in the example of FIG. 3, the control device 190 sets the merging position relative to the other vehicle B in front of the other vehicle B. In the example of FIG. 4, the control device 190 sets the merging position relative to the other vehicle B behind the other vehicle B.

The control device 190 may detect the number of lanes included in the merged lane and set the merging position according to the number of lanes. In the case where the number of lanes is large, there is a room for the other vehicle traveling in the merged lane to change the lane when the subject vehicle changes the lane from the merging lane to the merged lane. Therefore, there is a high possibility that the other vehicle can give up the space to the subject vehicle. On the other hand, in the case where the number of lanes included in the merged lane is small, since there is a high possibility that the other vehicle can give a space to the subject vehicle, the control device 190 gives priority to the other vehicle traveling in the merged lane ahead, and controls the subject vehicle to change the lane behind the other vehicle. The control device 190 compares the number of the detected lanes with a predetermined threshold of the number of lanes. Then, if the number of the detected lanes is equal to or greater than the threshold of the number of lanes, the control device 190 sets the merging position relative to the other vehicle in front of the other vehicle. On the other hand, if the number of the detected lanes is less than the threshold of the number of lanes, the control device 190 sets the merging position relative to the other vehicle behind the other vehicle.

Incidentally, when the other vehicle is not present around the subject vehicle, the control device 190 sets the merging position to a position suitable for lane change by automatic operation control.

In step S5, the control device 190 sets a merging determination criterion based on the road structure. The merging determination criterion is a criterion for determining whether or not the lane change is possible. As will be described later, in the present embodiment, a merging determination parameter is calculated as an index for determining whether or not merging is possible. The merging determination criterion is represented by a threshold value corresponding to the merging determination parameter. Merging determination threshold is set based on road structure. The merging determination threshold is set based on the position of the vehicle in the merging lane. The lower the merging determination threshold, the higher the possibility that a determination is performed that merging is possible. For example, in the vicinity of the entrance of the merging possible area, the merging determination threshold is set to a high value since it is expected that the vehicle speed of the subject vehicle is not sufficiently high. Hereinafter, a method of setting the merging determination criterion will be described.

The control device 190 sets a merging possible area based on the road structure and detects the length of the set merging possible area as the length of the merging lane. The control device 190 increases the merging determination threshold at the entrance of the merging possible area as the length of the merging lane increases. Then, the control device 190 sets the merging determination threshold so that the merging determination threshold gradually decreases toward the end b of the merging lane from the entrance of the merging possible area. When the subject vehicle is traveling in a merging lane, the closer the subject vehicle is to the end b, the less room is required to complete the lane change. Therefore, in the present embodiment, the merging determination threshold is lowered to increase the probability of lane change so that the closer the position of the subject vehicle is to the end b, the easier it is to determine that the lane change is possible. Further, in the case where the subject vehicle is traveling in the merging lane and the other vehicle is traveling in the merged lane behind the subject vehicle, there is a high possibility that the driver of the other vehicle will give way to the subject vehicle for the entry of the subject vehicle when the driver of the other vehicle sees the subject vehicle approaching the end b. Therefore, in the present embodiment, the control device 190 sets the merging determination threshold so that the merging determination threshold gradually decreases toward the end b of the merging lane. This prevents the vehicle from stopping in the vicinity of the end b. Further, in the entrance of the merging possible area, since the merging determination threshold is set to be high, there is a low possibility that it is determined that merging is possible. This avoids lane changes in the vicinity of the entrance of the merging possible area, and controls the vehicle to change the lane with the sufficient acceleration.

Also, the control device 190 sets the lower merging determination threshold in the vicinity of the entrance of the merging possible area, as the length of the merging lane determined by the road structure is shorter. In the merging area where the length of the merging lane is short, it is better to increase the probability that it is determined that merging is possible in the entire of the merging possible area since the range in which merging is possible is narrow. Therefore, in the present embodiment, when the length of the merging lane determined by the road structure is short, the control device 190 sets the merging determination threshold lower to increase the probability of changing lanes so that it is easier to determine that the lane change is possible.

Figure 5:
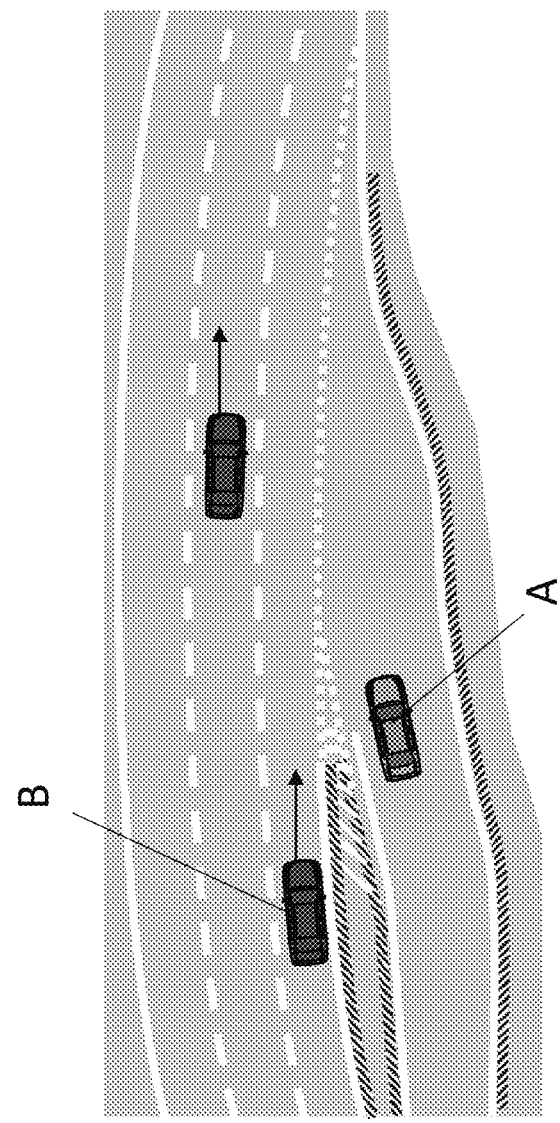
FIG. 5 is a diagram for explaining a control when a subject vehicle merges from a merging lane into an adjacent lane.

The control device 190 may detect the curvature of the merging lane and set a merging determination threshold based on the curvature. As shown in FIG. 5, the merging lane and the merged lane are curved. The control device 190 detects the curvature based on the road shape included in the map information. For example, if the subject vehicle is traveling in a merging lane with high curvature, the subject vehicle cannot accelerate sufficiently in the merging lane. Therefore, the merging determination threshold at the entrance of the merging possible area is raised so that the subject vehicle can perform lane change at as high a vehicle speed as possible. Thus, at the entrance of the merging possible area, the probability of determining that merging is possible decreases. This can prompt the lane change at the end of the merging lane. On the other hand, the control device 190 lowers the merging determination threshold at the entrance portion of the merging possible area when the subject vehicle is traveling in a merging lane with a low curvature because the subject vehicle can accelerate sufficiently in the merging lane. That is, the control device 190 sets the merging determination threshold based on the curvature so that the merging determination threshold at the entrance portion of the merging possible area is higher as the higher the curvature of the merging lane.

After the control flow in step S5, in step S6, the control device 190, based on the state of the subject vehicle and the other vehicle, sets a merging start position. The merging start position is a point at which the merging control is started, and is set on the merging lane. The control device 190 calculates the relative vehicle speed of the subject vehicle suitable for lane changes based on the current position of the subject vehicle, the current vehicle speed of the subject vehicle, the current position of the other vehicle, and the vehicle speed of the other vehicle. The control device 190 calculates the required distance to be the calculated relative vehicle speed. Then, the control device 190 sets the merging start position at a position separated by a necessary distance from the current position of the subject vehicle.

In step S7, the control device 190 detects the current position of the subject vehicle (a subject vehicle position), and determines whether the subject vehicle position has arrived at the merging start position. When the subject vehicle position does not arrive at the merging start position, the control device 190 executes the control flow of step S6. When the subject vehicle position arrives at the merging start position, the control device 190 executes the control flow of step S8.

In step S8, the control device 190 calculates the merging determination parameters based on the current position of the subject vehicle, the current speed of the subject vehicle, the current position of the other vehicle, and the vehicle speed of the other vehicle. The merging determination parameter is an index for determining whether merging is possible, and determined by the relative position of the subject vehicle relative to the other vehicle (distance), and the relative speed of the subject vehicle relative to the other vehicle. The larger the merging determination parameter, the higher the probability that it is determined that merging is possible. For example, the merging determination parameter may be indicated by the relative proximity of the subject vehicle to the other vehicle. For example, when the vehicle speed of the subject vehicle and the vehicle speed of the other vehicle are close values, the lower the degree of proximity as the longer the distance between the subject vehicle and the other vehicle. Further, even when the distance between the subject vehicle and the other vehicle is short, in the case where the other vehicle is traveling ahead of the subject vehicle in the vehicle traveling direction, the vehicle speed of the other vehicle is higher than the vehicle speed of the subject vehicle, proximity is set to the lower value. Proximity, for example, may be proximity time calculated by dividing the distance between the other vehicle and the subject vehicle by the relative speed of the subject vehicle relative to the other vehicle. It should be noted that other methods known at the time of application of the present application may be used as the calculation method of the proximity. The higher the proximity, the smaller the merging determination parameter.

In step S9, the control device 190 determines whether or not the other vehicle affecting the subject vehicle exists on the merged lane when the subject vehicle performs lane change. When there is no other vehicle, the control device 190 executes the control process of step S13. When there is the other vehicle, the control device 190 executes the control process of step S10.

In step S10, the control device 190 compares the merging determination parameter with the merging determination threshold, and determines, based on the comparison result, whether or not merging is possible. When the merging determination parameter is equal to or larger than the merging determination threshold, the control device 190 determines that merging is possible, and executes the control process of step S13. On the other hand, when the merging determination parameter is less than the merging determination threshold, the control device 190 determines that the merging is not possible, and executes the control process of step S11.

In step S11, the control device 190 detects the terminal distance from the current position of the subject vehicle to the end b of the merging lane and sets the merging position based on the terminal distance. In general, the vehicle speed of a vehicle traveling in a merging lane is lower than the vehicle speed of a vehicle traveling in a merged lane. If the distance from the current position of the subject vehicle to the end b of the merging lane is short, it is necessary to increase the vehicle speed of the subject vehicle than other vehicle in the merged lane in order to accelerate and attempt to enter in front of the other vehicle. In addition, it is necessary to increase the relative distance to other vehicle using the higher vehicle speed than the vehicle speed of the other vehicles. Thus, in a situation where the distance to the end b is short, it is difficult for the subject vehicle to secure the vehicle-to-vehicle distance while increasing the vehicle speed, and to enter in front of the other vehicle. In such a case, it is easier to control the subject vehicle to travel with the low vehicle speed and enter the rear of the other vehicle. Therefore, the control device 190 changes the merging position from the front of the other vehicle to the rear of the other vehicle when the terminal distance from the current position of the subject vehicle to the end b of the merging lane becomes shorter than the predetermined terminal distance threshold. Incidentally, if the merging position has already been set to the rear of the other vehicle, the control device 190 does not change the merging position. On the other hand, when the distance from the current position of the subject vehicle to the end b of the merging lane is long, the control device 190 does not change the merging position because the subject vehicle can be accelerated sufficiently and the distance between the subject vehicle and other vehicle can be secured.

In step S12, the control device 190 updates the merging determination criterion based on the current position of the subject vehicle. That is, the control device 190 performs the control loop from step S8 to step S12 repeatedly, and lowers the merging determination criterion as the subject vehicle approaches the end b. Then, the control device 190 executes the control process of step S8.

In step S13, the control device 190 executes the merging control based on the speed control amount and the steering control amount. In the merging control, the steering actuator is controlled so that an actual amount of operation of the steering becomes the steering control amount while the subject vehicle maintains the speed indicated by the speed control amount. Thus, the subject vehicle travels toward the target point and begins to enter the merged lane from the merging lane.

In step S14, the control device 190 determines whether the current position of the vehicle has arrived at the target point. When the subject vehicle has not arrived at the target point, the control device 190 performs merging control. When the subject vehicle has arrived at the target point, the control device 190 ends the vehicle control process in step S14 to end the control flow.

As described above, the travel assistance method according to one or more embodiments of the present invention includes detecting the road structure including the merging point where the merging lane and the merged lane merge, detecting the state of another vehicle traveling toward the merging point, setting, based on the road structure, the merging position relative to the traveling vehicle (other vehicle) traveling in the merged lane and the determination criterion for determining whether or not merging is possible at the merging position, and determining whether or not merging is possible at the merging position based on the state of a subject vehicle, the state of the other vehicle, and the determination criterion. As a result, appropriate merge control at the merge position can be performed.

Further, the travel assistance method according to one or more embodiment of the present invention includes detecting the length of the merging lane as the road structure at the merging point and setting the merging position based on the length of the merging lane. For example, if the relative position of the subject vehicle and the other vehicle in the traveling direction is the same, the length of the merging lane affects the merging position relative to the other vehicle. The longer the merging lane, the more easily the subject vehicle accelerates and enters in front of the other vehicle. If the merging lane is short, the subject vehicle enters behind the other vehicle because acceleration is insufficient. In the present embodiment, the position to merge relative to the other vehicle is set by the length of the merging lane. This can increase the frequency that the subject vehicle can enter ahead of the other vehicle. In addition, this can restrain the travel of the subject vehicle from being hindered by the other vehicle. As a result, excessive extension of the travel time can be suppressed because the number of attempts to change the lane is reduced.

Further, the travel assistance method according to one or more embodiment of the present invention includes detecting the terminal distance from the position of the vehicle traveling in the merging lane to the end of the merging lane, and setting the merging position based on the terminal distance. This enables the subject vehicle to merge according to the position of the end of the merging lane, and reduces the probability of stopping at the end of the merging lane. In other words, since this can reduce the probability of stopping in a merging lane, this can restrain extending the travel time.

The travel assistance method according to one or more embodiment of the present invention includes detecting the number of lanes included in the merged lane and setting the merging position based on the number of lanes. As a result, appropriate merging control at the merging position can be performed. In addition, the extension of the travel time can be restrained.

Further, the travel assistance method according to one or more embodiment of the present invention includes detecting the curvature of the merging lane, and setting the determination criterion based on the curvature. As a result, appropriate merging control at the merging position can be performed.

Further, the travel assistance method according to one or more embodiment of the present invention includes setting the merging position in front of the other vehicle traveling in the merged lane when the subject vehicle is traveling in the merging lane and the length of the merging lane is longer than a predetermined length. Thus, this can increase the frequency that the subject vehicle can enter ahead of the other vehicle. In addition, this can restrain the travel of the subject vehicle from being hindered by the other vehicle. As a result, the excessive extension of the travel time can be suppressed because the number of attempts to change the lane is reduced.

Further, the travel assistance method according to one or more embodiment of the present invention includes setting the merging position to the rear of the other vehicle traveling in the merged lane when the subject vehicle is traveling in the merging lane and the length of the merging lane is shorter than a predetermined length. As a result, appropriate merging control at the merging position can be performed.

As a modification, the travel assistance method according to one or more embodiment of the present invention may include setting the range of the merging possible area wider as the longer the merging lane and setting the merging position in the merging possible area. Merging position is set within the range of the merging possible area but by lengthening the range of the merging possible area in the vehicle traveling direction, the range where the merging position can be set in an appropriate position relative to the position of the other vehicle is expanded. As a result, the appropriate merging control at the merging position can be performed. Further, this can suppress the travel of the subject vehicle from being hindered by the other vehicle, and suppress the excessive extension of the travel time.

Further, as a modification, the travel assistance method according to one or more embodiment of the present invention includes detecting the terminal distance from the position of the vehicle traveling in the merging lane to the end of the merging lane, setting the range from the front of the traveling vehicle to the end of the merging lane as a merging possible area, setting the range of the merging possible area wider as the longer the terminal distance, and setting the merging position within the merging possible area. As a result, the appropriate merge control at the merge position can be performed. Further, this can suppress the travel of the subject vehicle from being hindered by the other vehicle, and suppress the excessive extend of the travel time.

Further, as a modification, the travel assistance method according to one or more embodiment of the present invention may include setting the range of the merging possible area wider as the more the number of lanes and setting merging position within the merging possible area. As a result, the appropriate merge control at the merge position can be performed. Further, this can suppress the travel of the subject vehicle from being hindered by the other vehicle and suppress the excessive extension of the travel time.

Further, as a modification, the travel assistance method according to one or more embodiment of the present invention may include detecting a feature existing at the boundary portion between the merging lane and the merged lane and setting the merging position near the end of the merging lane on the merged lane when the height of the feature is larger than the predetermined height threshold. Thus, since the lane change is performed near the end of the merging lane, there is a larger room for detecting the other vehicle. As a result, there is a higher possibility that the subject vehicle can merge according to the situation of the other vehicle.

Figure 6:
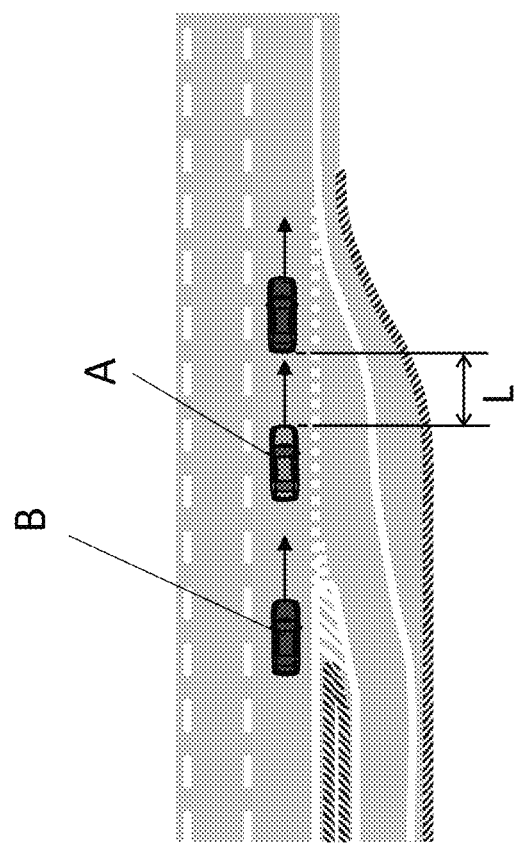
FIG. 6 is a diagram for explaining a control when a subject vehicle merges from a merging lane to an adjacent lane.

As a modification of the travel assistance method according to one or more embodiment of the present invention, the control device 190 may correct the lower limit of the merging determination criterion depending on the situation of the vehicle traveling on the merged lane. FIG. 6 is a diagram for explaining a road condition after the subject vehicle A changes the lane. For example, it is assumed that two other vehicles are traveling on the merged lane before the subject vehicle changes the lane and that the distance from the current position of the subject vehicle to the end of the merging lane is short. Then, suppose that the minimum car-to-car distance is 5.5 m and time to collision (TTC) is set to 1.5 seconds as the lower limit value for performing merging control. The control device 190, from the state of the other vehicle on the merged lane and the state of the subject vehicle, set the one with a substantially wider inter-vehicle distance among the minimum car-to-car distance and the time to collision, to the lower limit value of the merging determination criterion. For example, if the other vehicle is traveling at a speed of 60 km/h, the distance between vehicles will be 25 m based on the time to collision (TTC) of 1.5 seconds. Then, the control device 190 sets the proximity corresponding to the minimum vehicle-to-vehicle distance of 25 m to the lower limit value of the merging determination criterion. Thus, for example, in the example of FIG. 6, when the distance L is 25 m or less, the control device 190 can determine that the lane change is not possible.

Second Embodiment

A travel assistance device 100 according to another embodiment of the present invention will be described. In the present embodiment, unlike the first embodiment, the control is performed when the subject vehicle is traveling in a merged lane. Other configurations and the same control as those of the first embodiment are appropriately incorporated in the description of the second embodiment.

Figure 7:
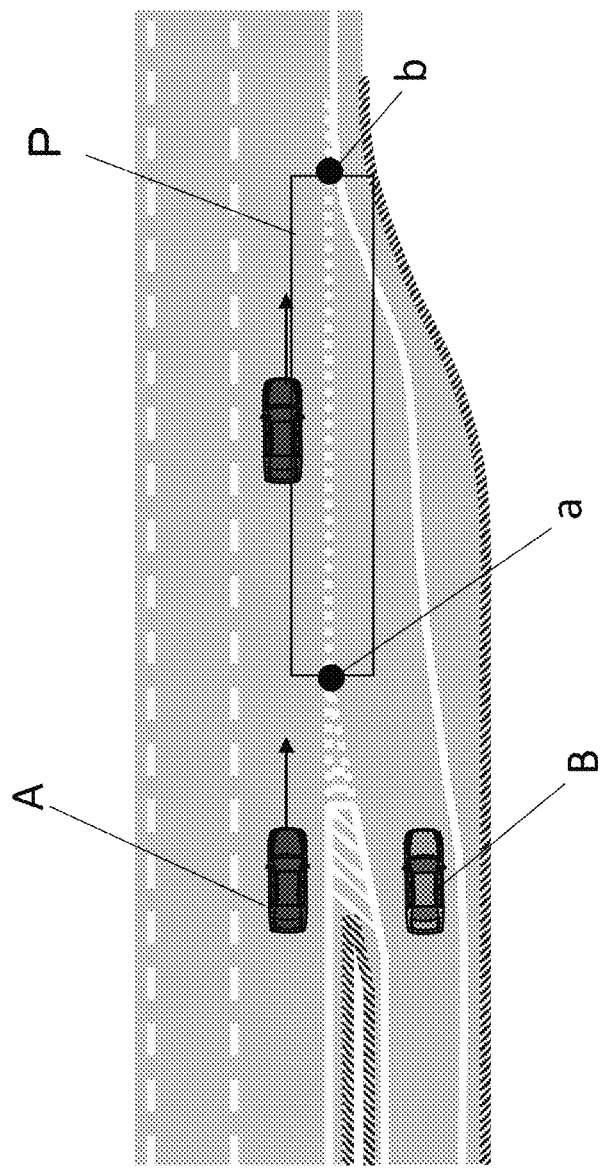
FIG. 7 is a diagram for explaining a control when another vehicle merges from a merging lane into an adjacent lane.
Figure 8:
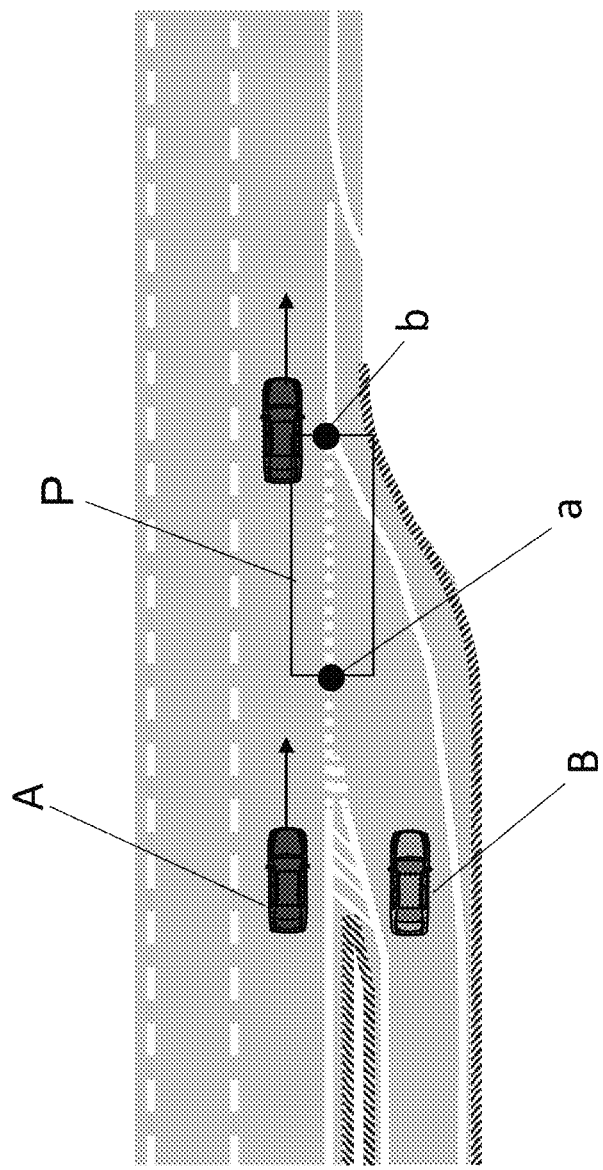
FIG. 8 is a diagram for explaining a control when another vehicle merges from a merging lane from an adjacent lane.

The control processing at the time of merging according to the present embodiment will be described. FIGS. 7 and 8 are diagrams for explaining control when the other vehicle merges from a merging lane into an adjacent lane. The road structure of FIG. 7 is the same as that of FIG. 3, and the road structure of FIG. 8 is the same as that of FIG. 4.

When the subject vehicle is traveling in the merged lane, the control device 190 performs the following controls when the subject vehicle approaches the merging lane.

The control device 190 acquires the vehicle information of the subject vehicle from the subject vehicle position detecting device 120 and the on-board device 140. Further, the control device 190 acquires the vehicle information of the other vehicle using the sensor group 110 or the like. The control device 190 acquires the map information from the map database 130, and detects the road structure around the subject vehicle position. The control device 190 identifies the merging section based on the road structure.

The control device 190, based on the road structure, identifies the merging possible area, and sets the merging position in the merging possible area. As in the example of FIG. 7, when the length of the merging lane is long, the difference between the vehicle speed of the subject vehicle at the time of merging control start and the vehicle speed of the vehicle traveling in the merged lane is small since the other vehicle can perform sufficiently acceleration. In such a case, when the other vehicle performs the lane change from the merging lane to the merged lane, the other vehicle perform the lane change in front of the subject vehicle. Therefore, the merging position is set in front of the subject vehicle traveling in the merged lane.

As in the example of FIG. 8, when the length of the merging lane is short, the difference between the vehicle speed of the other vehicle at the time of merging control start and the vehicle speed of the subject vehicle traveling in the merged lane is large since the other vehicle cannot perform sufficiently acceleration. In such a case, when the other vehicle performs lane change from the merging lane to the merged lane, the merging position is set behind the subject vehicle traveling in the merged lane since the other vehicle performs lane change behind the subject vehicle.

The control device 190 compares the length of the merging lane included in the road structure with a determination threshold. If the length of the merging lane is equal to or larger than the determination threshold, the control device 190 sets the merging position in front of the subject vehicle. On the other hand, if the length of the merging lane is less than the determination threshold, the control device 190 sets the merging position behind the subject vehicle.

The control device 190 sets a merging determination criterion based on the road structure. The merging determination criterion is a criterion for determining whether or not the other vehicle changes lane. The control device 190 calculates the merging determination parameter for the other vehicle when detecting the other vehicle traveling in the merging lane while the subject vehicle is traveling in the merged lane. The method of calculating the merging determination parameter is the same as that of the first embodiment.

The control device 190 sets a merging possible area based on the road structure and detects the length of the set merging possible area as the length of the merging lane. The control device 190 increases the merging determination threshold at the entrance of the merging possible area as the length of the merging lane increases. Then, the control device 190 sets the merging determination threshold so that the merging determination threshold gradually decreases toward the end b of the merging lane from the entrance portion of the merging possible area. When the other vehicle is traveling in a merging lane, the margin for completing the lane change decreases as the other vehicle approaches the end b. Therefore, in the present embodiment, the merging determination threshold is lowered to increase the probability of lane change so that the closer the position of the other vehicle is to the end b, the easier it is to determine that the other vehicle changes lane.

Also, the control device 190 lowers the merging determination threshold in the vicinity of the entrance of the merging possible area as the length of the merging lane determined by the road structure is shorter. It is better to increase the probability of determining that the other vehicle performs lane change throughout the merging possible area since the range where merging is possible is narrow in the merging portion where the length of the merging lane is short. Therefore, in this embodiment, when the length of the merging lane determined by the road structure is short, the merging determination threshold is lowered to increase the probability of lane change so that the easier it is to determine that lane change is possible.

Then, the control device 190 compares the merging determination parameter with the merging determination threshold. When the merging determination parameter is equal to or greater than the merging determination threshold, the control device 190 determines that the other vehicle performs the lane change. When the merging determination parameter is less than the merging determination threshold, the control device 190 determines that the other vehicle does not performs the lane change.

When determining that the other vehicle performs the lane change, the control device 190 controls the vehicle speed according to the set merging position. That is, when the merging position is set to the front of the subject vehicle, the control device 190 decelerates the vehicle speed to ensure the minimum vehicle-to-vehicle distance. On the other hand, when the merging position is set to the rear of the subject vehicle, the control device 190 accelerates the vehicle speed to ensure the minimum vehicle-to-vehicle distance.

As described above, the travel assistance method according to one or more embodiment of the present invention includes detecting a road structure including a merging point where a merging lane and a merged lane merge, detecting the state of another vehicle traveling toward the merging point, setting, based on the road structure, a merging position relative to the traveling vehicle (subject vehicle) traveling in the merged lane and a determination criterion for determining whether merging is possible at the merging position, and determining, based on the state of the subject vehicle, the state of the other vehicle and the determination criterion, whether or not merging is possible at the merging position. As a result, appropriate merging control at the merging position can be performed.

Further, the travel assistance method according to one or more embodiment of the present invention includes setting the merging position where the other vehicle merges from the merging lane into the merged lane in front of the subject vehicle when the subject vehicle is traveling in the merged lane and the length of the merging lane is shorter than a predetermined length. As a result, appropriate merging control at the merging position can be performed.

EXPLANATIONS OF LETTERS OR NUMERALS

100 . . . Travel assistance device
110 . . . Sensor group
120 . . . Subject vehicle position detecting device
130 . . . Map database
140 . . . On-board device
150 . . . Notification device
160 . . . Input device
170 . . . Communication device
180 . . . Drive control device
190 . . . Control device

The invention claimed is:

1. A travel assistance method for a vehicle, executed by a processor, comprising:
   detecting a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, setting, behind the other vehicle, a merging position of the subject vehicle at the merging point when a length of the merging lane is shorter than a predetermined length; and
   executing by the processor a merging control of the subject vehicle.

2. A travel assistance device for a vehicle, comprising a processor configured to:
   detect a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, set, behind the other vehicle, a merging position of the subject vehicle at the merging point when a length of the merging lane is shorter than a predetermined length; and
   execute a merging control of the subject vehicle.

3. A travel assistance method for a vehicle, executed by a processor, comprising:
   detecting a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, setting, behind the other vehicle, a merging position of the subject vehicle at the merging point when a terminal distance from a position of the subject vehicle to an end of the merging lane is shorter than a threshold; and
   executing by the processor a merging control of the subject vehicle.

4. A travel assistance method for a vehicle, executed by a processor, comprising:
   detecting a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, setting, behind the other vehicle, a merging position of the subject vehicle at the merging point when a number of lanes included in the merged lane is less than a threshold; and
   executing by the processor a merging control of the subject vehicle.

5. A travel assistance method for a vehicle, executed by a processor, comprising:
   detecting a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, setting a merging determination threshold for determining whether or not merging is possible, wherein the merging determination threshold at an entrance portion of a merging possible area is higher as curvature of the merging lane is higher, the merging possible area being a range from a position of the subject vehicle to an end of the merging lane; and
   executing by the processor a merging control of the subject vehicle.

6. A travel assistance method for a vehicle, executed by a processor, comprising:
   detecting a merging point into which a merging lane and a merged lane merge, the merging lane being a lane in which a subject vehicle is traveling, and the merged lane being adjacent to the merging lane;
   in a case in which another vehicle traveling in the merged lane toward the merging point is detected, setting, at an end of the merging lane, a merging position of the subject vehicle at the merging point when a height of a feature existing at a boundary portion between the merging lane and the merged lane is higher than a predetermined height threshold; and
   executing by the processor a merging control of the subject vehicle.

* * * * *